United States Patent
Yoshimura

(10) Patent No.: US 9,760,295 B2
(45) Date of Patent: Sep. 12, 2017

(54) ATOMIC RIGHTS IN A DISTRIBUTED MEMORY SYSTEM

(71) Applicant: Toshiba Memory Corporation, Minato-ku (JP)

(72) Inventor: Noritsugu Yoshimura, Fuchu (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 286 days.

(21) Appl. No.: 14/640,610

(22) Filed: Mar. 6, 2015

(65) Prior Publication Data

US 2016/0070489 A1    Mar. 10, 2016

Related U.S. Application Data

(60) Provisional application No. 62/046,507, filed on Sep. 5, 2014.

(51) Int. Cl.
*G06F 3/06* (2006.01)
*G06F 12/02* (2006.01)

(52) U.S. Cl.
CPC .......... *G06F 3/0619* (2013.01); *G06F 3/0659* (2013.01); *G06F 3/0688* (2013.01); *G06F 12/0246* (2013.01)

(58) Field of Classification Search
CPC .... G06F 3/0619; G06F 3/0622; G06F 3/0659; G06F 3/0688; G06F 12/0238; G06F 12/0246
See application file for complete search history.

(56) References Cited

U.S. PATENT DOCUMENTS

| | | | |
|---|---|---|---|
| 8,055,816 B2 | 11/2011 | Asnaashari et al. | |
| 8,250,333 B2 | 8/2012 | Gorobets et al. | |
| 8,396,995 B2 | 3/2013 | Asnaashari et al. | |
| 8,468,294 B2 | 6/2013 | Huang et al. | |
| 8,751,700 B2 | 6/2014 | Asnaashari et al. | |
| 2012/0089854 A1* | 4/2012 | Breakstone | G06F 1/30 713/323 |
| 2012/0153912 A1 | 6/2012 | Demski et al. | |
| 2013/0275656 A1 | 10/2013 | Talagala et al. | |
| 2014/0310431 A1 | 10/2014 | Asnaashari et al. | |

(Continued)

FOREIGN PATENT DOCUMENTS

| | | |
|---|---|---|
| JP | 2012-514794 A | 6/2012 |
| JP | 2012-523612 A | 10/2012 |

*Primary Examiner* — Hal Schnee
(74) *Attorney, Agent, or Firm* — Oblon, McClelland, Maier & Neustadt, L.L.P.

(57) ABSTRACT

According to one embodiment, a memory system includes a plurality of memories, a plurality of first processing units, and a second processing unit. The plurality of first processing units are respectively connected to one of the memories. The second processing unit sequentially distributes a plurality of first data inputted externally sequentially to the plurality of first processing units. Each of the first processing units outputs first data distributed thereto to the one of the memories. The second processing unit, until finishing transmission of a second data to one of the first processing units, keeps the others of the first processing units standing by outputting already-distributed first data. The second data is a last data from among the plurality of first data inputted externally.

12 Claims, 11 Drawing Sheets

(56) References Cited

U.S. PATENT DOCUMENTS

| | | | |
|---|---|---|---|
| 2015/0113326 A1* | 4/2015 | Talagala | G06F 11/1441 714/24 |
| 2015/0212760 A1* | 7/2015 | Goel | G06F 3/0689 714/6.3 |
| 2016/0170850 A1* | 6/2016 | Williams | G06F 11/2069 714/6.23 |
| 2016/0342351 A1* | 11/2016 | Li | G06F 11/1471 |

* cited by examiner

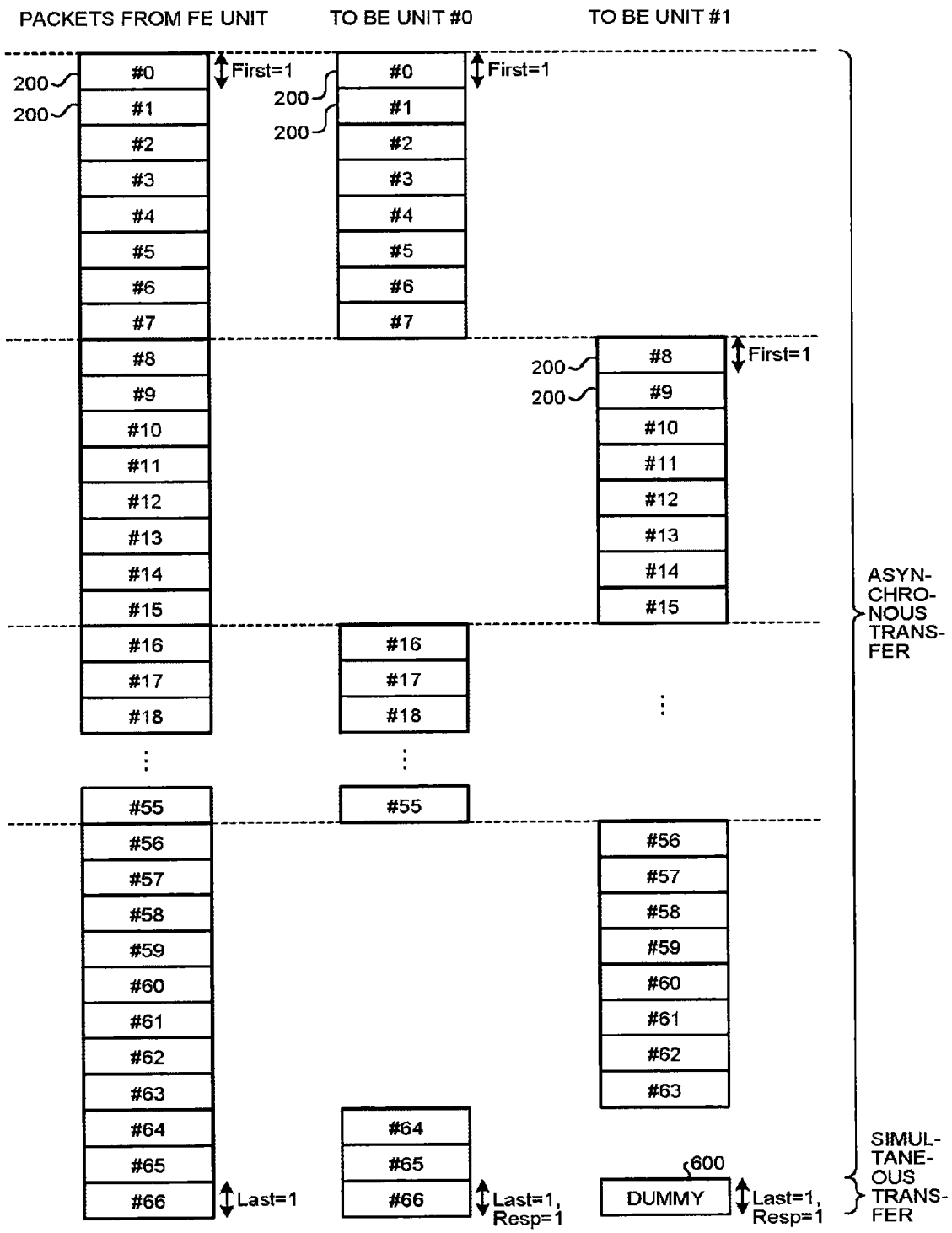

ATOMIC RIGHTS IN A DISTRIBUTED MEMORY SYSTEM

CROSS-REFERENCE TO RELATED APPLICATIONS

This application is based upon and claims the benefit of priority from U.S. Provisional Patent Application No. 62/046,507, filed on Sep. 5, 2014; the entire contents of which are incorporated herein by reference.

FIELD

Embodiments described herein relate generally to a memory system.

BACKGROUND

Conventionally, there have been memory systems having a plurality of memory chips that are nonvolatile memories. The memory system stores data which a write command has requested to write into memory chips in a distributed manner. The data which a write command has requested to write is referred to as write data. If an error in the transfer of write data occurs, the memory system may be required to return to the state present immediately before starting to write that write data. Such writing is referred to as atomic write.

BRIEF DESCRIPTION OF THE DRAWINGS

FIG. 12 is a conceptual diagram for explaining processing by the split unit of the second embodiment.

DETAILED DESCRIPTION

In general, according to one embodiment, a memory system includes a plurality of memories, a plurality of first processing units, and a second processing unit. The plurality of first processing units are respectively connected to one of the memories. The second processing unit sequentially distributes a plurality of first data inputted externally sequentially to the plurality of first processing units. Each of the first processing units outputs first data distributed thereto to the one of the memories. The second processing unit, until finishing transmission of a second data to one of the first processing units, keeps the others of the first processing units standing by outputting already-distributed first data. The second data is a last data from among the plurality of first data inputted externally.

Exemplary embodiments of a memory system will be explained below in detail with reference to the accompanying drawings. The present invention is not limited to the following embodiments.

First Embodiment

Figure 1:
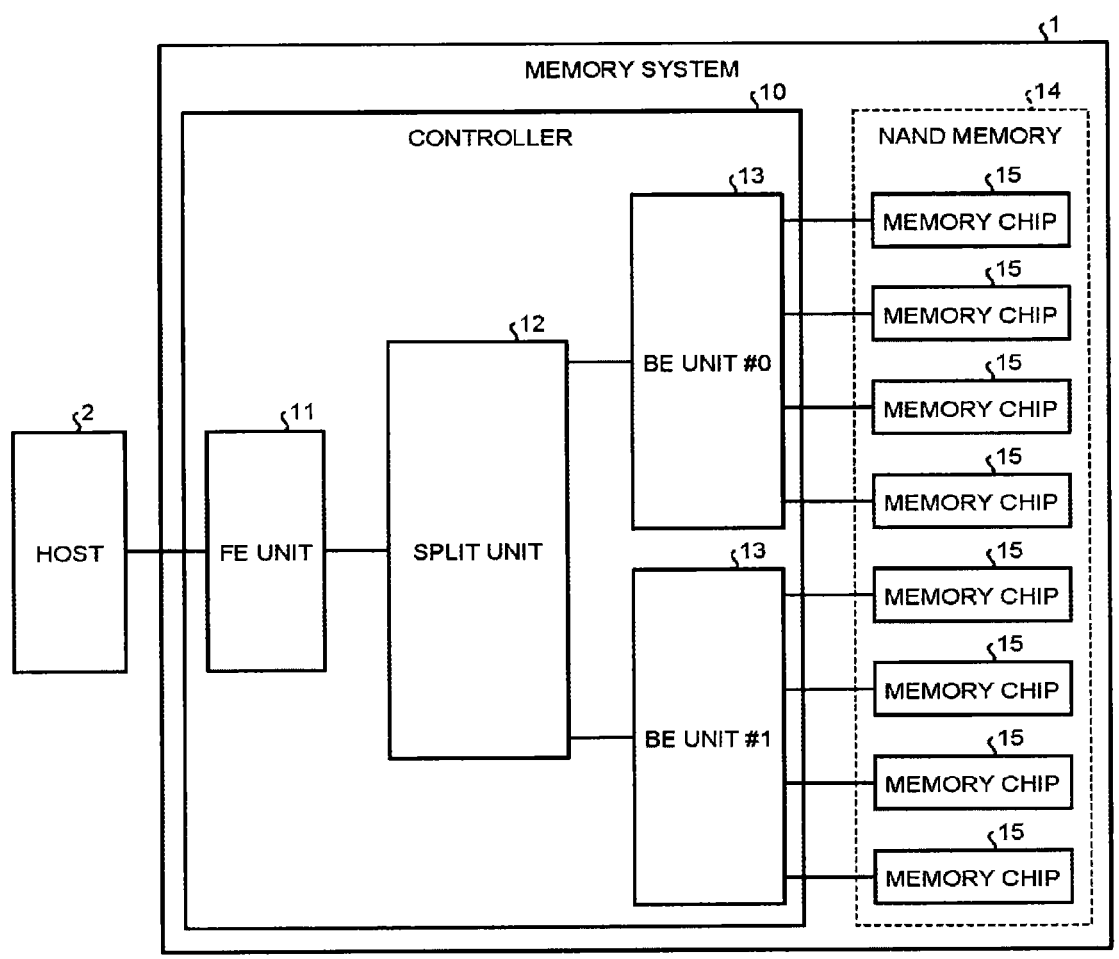
FIG. 1 is a diagram showing the configuration of a memory system of a first embodiment.

FIG. 1 is a diagram showing the configuration of a memory system of the first embodiment. The memory system 1 is connected to a host 2. The host 2 is, for example, a personal computer, a server, a mobile information processing device, or the like. The memory system 1 functions as an external storage device for the host 2. The host 2 can issue a write command to the memory system 1 to have it execute atomic write. Write data is associated with the write command. The write command has recorded therein at least a logical address specifying the starting location of the storage destination for the write data and the size of the write data. The write command and the write data are transferred in the form of frames.

The memory system 1 comprises a controller 10 and a NAND flash memory (NAND memory) 14 used as a storage. The type of memory used as a storage need only be a nonvolatile memory, not being limited to a NAND flash memory. For example, a NOR flash memory, ReRAM (Resistance Random Access Memory), MRAM (Magnetoresistive Random Access Memory), or the like can be adopted.

The NAND memory 14 comprises a plurality of, here eight, memory chips 15. The eight memory chips 15 are connected to the controller 10 via respective different channels. Each channel is formed of lines including I/O signal lines and control signal lines. The I/O signal lines are ones for transmitting and receiving, e.g., data, addresses, and commands. The control signal lines are ones for transmitting and receiving, e.g., a WE (write enable) signal, an RE (read enable) signal, a CLE (command latch enable) signal, an ALE (address latch enable) signal, a WP (write protection) signal, and the like. The controller 10 can control the channels individually. The controller 10 can have the eight memory chips 15 connected to the different channels simultaneously operate, by controlling the eight channels simultaneously and individually. Note that a plurality of memory chips 15 may be connected to each channel.

The controller 10 transfers write data from the host 2 to the NAND memory 14. The controller 10 can have the eight memory chips 15 perform data writing in parallel by using the fact of being connected individually to the memory chips 15.

The controller 10 comprises a front end (FE) unit 11, a split unit 12, and two back end (BE) units 13.

The FE unit 11 transmits write data from the host 2 in units of sector-size data (hereinafter called sector data) to the split unit 12. The FE unit 11 transmits each sector data in the form of a packet to the split unit 12.

Figure 2:
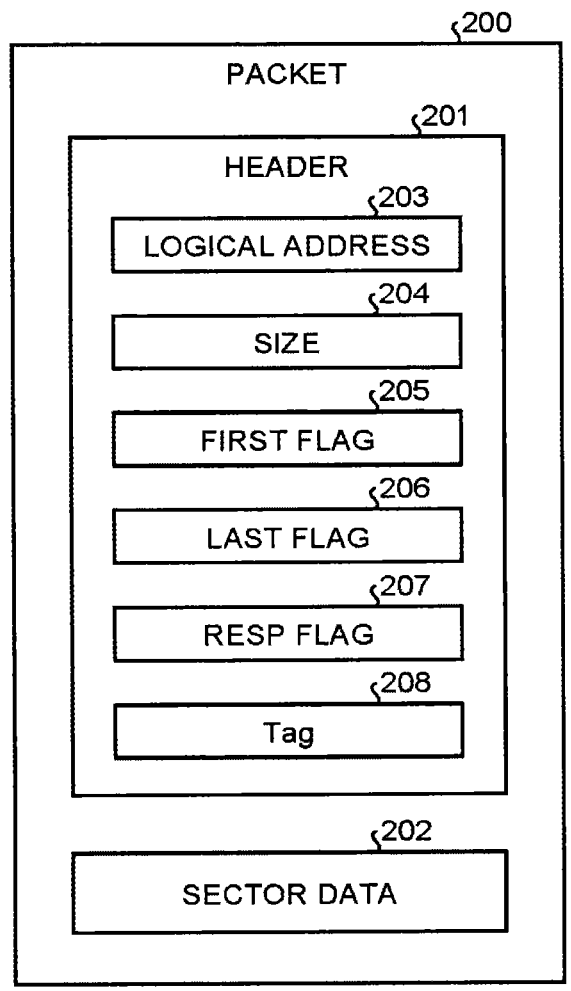
FIG. 2 is a diagram for explaining an example configuration of a packet.

FIG. 2 is a diagram for explaining an example configuration of the packet. The packet 200 comprises a header 201. The header 201 has a logical address 203, a size 204, a first flag 205, a last flag 206, a reap flag 207, and a tag 208 recorded therein. Further, the packet 200 comprises sector data 202. The sector data 202 forms part or all of the write data.

The logical address 203 specifies the location of the storage destination for the sector data 202 included in the same packet 200. That is, the logical address 203 is assigned to each sector data 202. The logical address 203 is computed based on the logical address included in the write command. For example, if the sector data 202 included in the same packet 200 is the nth sector data 202 in the order of from the start in the write data, then the logical address 203 takes on a value obtained by adding n−1 to the logical address included in the write command. The same value as the size included in the write command is recorded as the size 204. That is, the size 204 specifies the size of one write data. The first flag 205 is a flag to identify a packet 200 to be transferred first where one write data is transferred in multiple packets 200. The last flag 206 is a flag to identify a packet 200 to be transferred last where write data is transferred in multiple packets 200. The resp flag 207 is a flag to request a response after a process in the BE unit 13 finishes. The process in the BE unit 13 includes, for example, the process of transmitting sector data 202 to the NAND memory 14 or the process of storing sector data 202 in a buffer (storage device 401) provided in the BE unit 13. The tag 208 is identification information that the FE unit 11 issues for each write command received from the host 2. The tags 208 of the same value are given to the multiple packets 200 corresponding to the same command. For example, the tags 208 of the same value are given to multiple packets 200 including respective sector data 202 that form one write data.

The number of packets 200 to transfer write data in varies according to the size of the write data. The FE unit 11 records "1" in the first flag 205 of the initial packet 200. The FE unit 11 records "1" in each of the last flag 206 and the resp flag 207 of the last packet 200.

If an error occurs in transfer from the host 2, the FE unit 11 transmits an abort processing instruction to the split unit 12. The abort processing is a process of making the memory system 1 return to the state present before executing the write command.

One of the two BE units 13 is connected to four of the eight memory chips 15. The other of the two BE units 13 is connected to the remaining four of the eight memory chips 15. When the two BE units 13 need to be distinguished, hereinafter they may be identified respectively by numbers such as BE unit #0 and BE unit #1.

Figure 3:
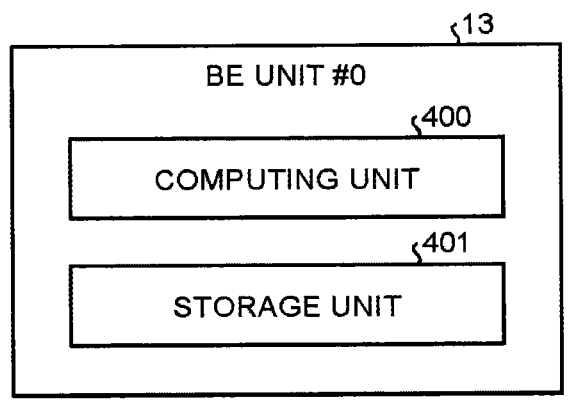
FIG. 3 is a diagram showing the configuration of a BE unit.

FIG. 3 is a diagram showing the configuration of the BE unit 13. The two BE units 13 have the same configuration. Here, the configuration of the BE unit #0 as a representative will be described. The BE unit #0 comprises a computing unit 400 and a storage unit 401. The computing unit 400 is, for example, a CPU (Central Processing Unit). The computing unit 400 performs various processes by executing programs. The processes performed by the computing unit 400 include, for example, translation between logical addresses and physical addresses, compaction processing, wear leveling processing, and data transfer between the split unit 12 and the NAND memory 14. The storage unit 401 is constituted by, e.g., a RAM (Random Access Memory). The storage unit 401 functions as a work area for the computing unit 400 and a buffer for data transfer. The computing unit 400 stores sector data 202 recorded in each packet 200 into the storage unit 401 and, when receiving a packet 200 having "1" recorded in the last flag 206 thereof, transfers the plurality of sector data 202 stored in the storage unit 401 to the NAND memory 14. When receiving a packet 200 having "1" recorded in the resp flag 207 thereof, the computing unit 400 outputs a response after the execution of the predetermined process.

The split unit 12 transmits packets 200 received from the FE unit 11 to either the BE unit #0 or BE unit #1.

Figure 4:
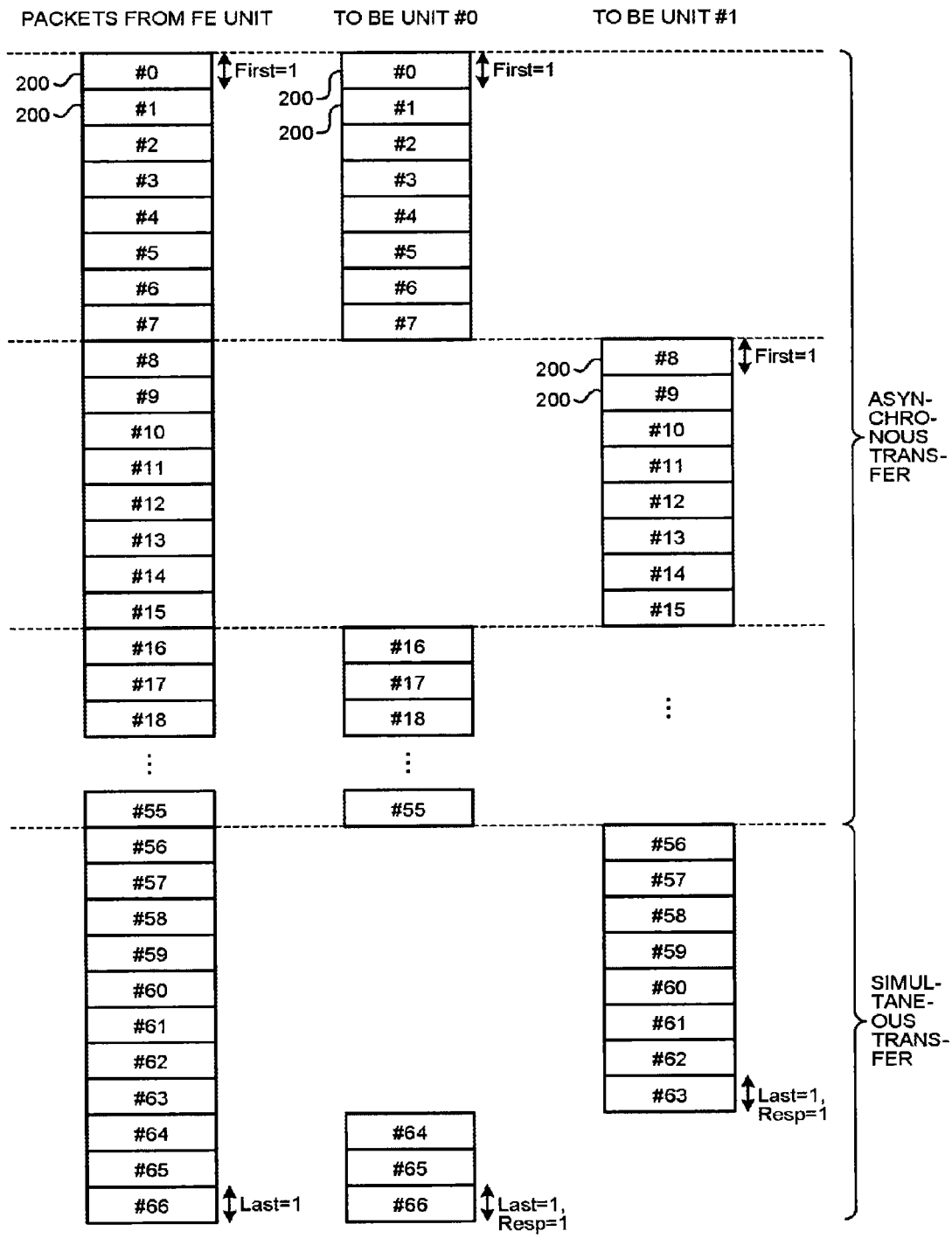
FIG. 4 is a conceptual diagram for explaining processing by a split unit of the first embodiment.

FIG. 4 is a conceptual diagram for explaining processing by the split unit 12. Here, let one write data be formed of 67 sector data. That is, one write data is transferred in 67 packets 200. The 67 packets 200 are designated by numbers #0 to #66 in order in a time series to distinguish them.

The packet 200 which the split unit 12 receives first is referred to as the first packet. The packet 200 which the split unit 12 receives last is referred to as the end packet. The first packet has "1" recorded in the first flag 205 thereof. The end packet #66 has "1" recorded in the last flag 206 thereof.

The split unit 12 splits packets 200 into groups of a predetermined number of packets so that each BE unit 13 can receive sector data in cluster units, one at a time. The cluster is a unit having a size that is multiple times the sector size. The cluster may be equal to or not equal to the unit in which each BE unit 13 transfers data to the NAND memory 14. Here, it is supposed that the cluster has a size that is eight times the sector size. That is, one cluster is formed of sector data respectively included in eight packets 200. The last cluster may be formed of data from less than eight packets 200. Hereinafter, multiple packets 200 for transferring one cluster may be referred to as a cluster for convenience of description.

The split unit 12 performs splitting based on the value of a specific bit of the logical address 203. Here, if the value of the third bit from the lower side of the logical address 203 recorded in a packet 200 is an even number, then the split unit 12 transmits the packet 200 to the BE unit #0. If the value of the third bit from the lower side of the logical address 203 recorded in a packet 200 is an odd number, then the split unit 12 transmits the packet 200 to the BE unit #1. Since splitting is performed based on the value of the third bit from the lower side of the logical address 203, the BE unit 13, the transmission destination of 67 packets 200, is switched for every eight packets (i.e., every cluster).

A packet 200 transferred last to each BE unit 13 is referred to as the last packet. Each BE unit 13 stores packets from the split unit 12 into the storage unit 401 and, when receiving the last packet, starts processing the packets stored in the storage unit 401. The split unit 12 records "1" in the last flag 206 and resp flag 207 of a packet 200 to be transferred last to the BE unit 13 so that the BE unit 13 can identify the last packet. Here, the split unit 12 records "1" in the last flag 206 and resp flag 207 of the last packet #63 for the BE unit #1. Further, the split unit 12 overwrites the last flag 206 and resp flag 207 of the last packet #66 for the BE unit #0 with "1".

The split unit 12 starts the transfer of clusters each including the last packet to the two BE units 13 at the same time. Here, the split unit 12 starts the transfer of a cluster formed of packet #56 to packet #63 to the BE unit #1 and the transfer of a cluster formed of packet #64 to packet #66 to the BE unit #0 at the same time. The split unit 12 can transfer clusters not including the last packet to the BE unit #0 and BE unit #1 without synchronizing transfers to them.

The split unit 12 may record "1" in the first flag 205 of a packet 200 to be transferred first to each BE unit 13. Here, for example, the split unit 12 records "1" in the first flag 205 of packet #8, the initial packet 200 to be transmitted to the BE unit #1.

Figure 5:
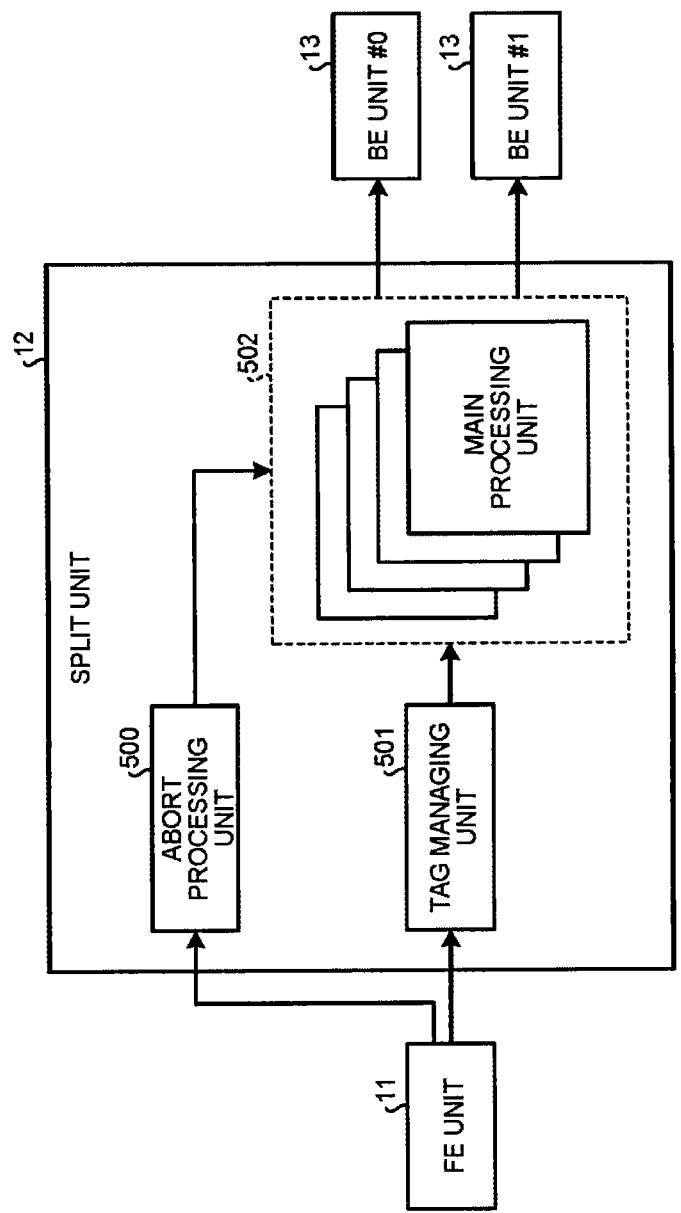
FIG. 5 is a diagram showing the configuration of the split unit of the first embodiment.

FIG. 5 is a diagram showing the configuration of the split unit 12. The split unit 12 comprises an abort processing unit 500, a tag managing unit 501, and a plurality of main processing units 502. The main processing units 502 split respectively groups of packets 200 having the tag 208 of a different value between groups. The tag managing unit 501 identifies one of the main processing units 502 based on the value of the tag 208 of each packet 200 from the FE unit 11 and inputs the packet 200 to the identified main processing unit 502. That is, the split unit 12 can handle a plurality of write data in parallel by switching the main processing units 502 for each value of the tag 208. When receiving an abort processing instruction from the FE unit 11, the abort processing unit 500 resets the main processing unit 502 that is performing the process for the command subject to abort processing.

Figure 6:
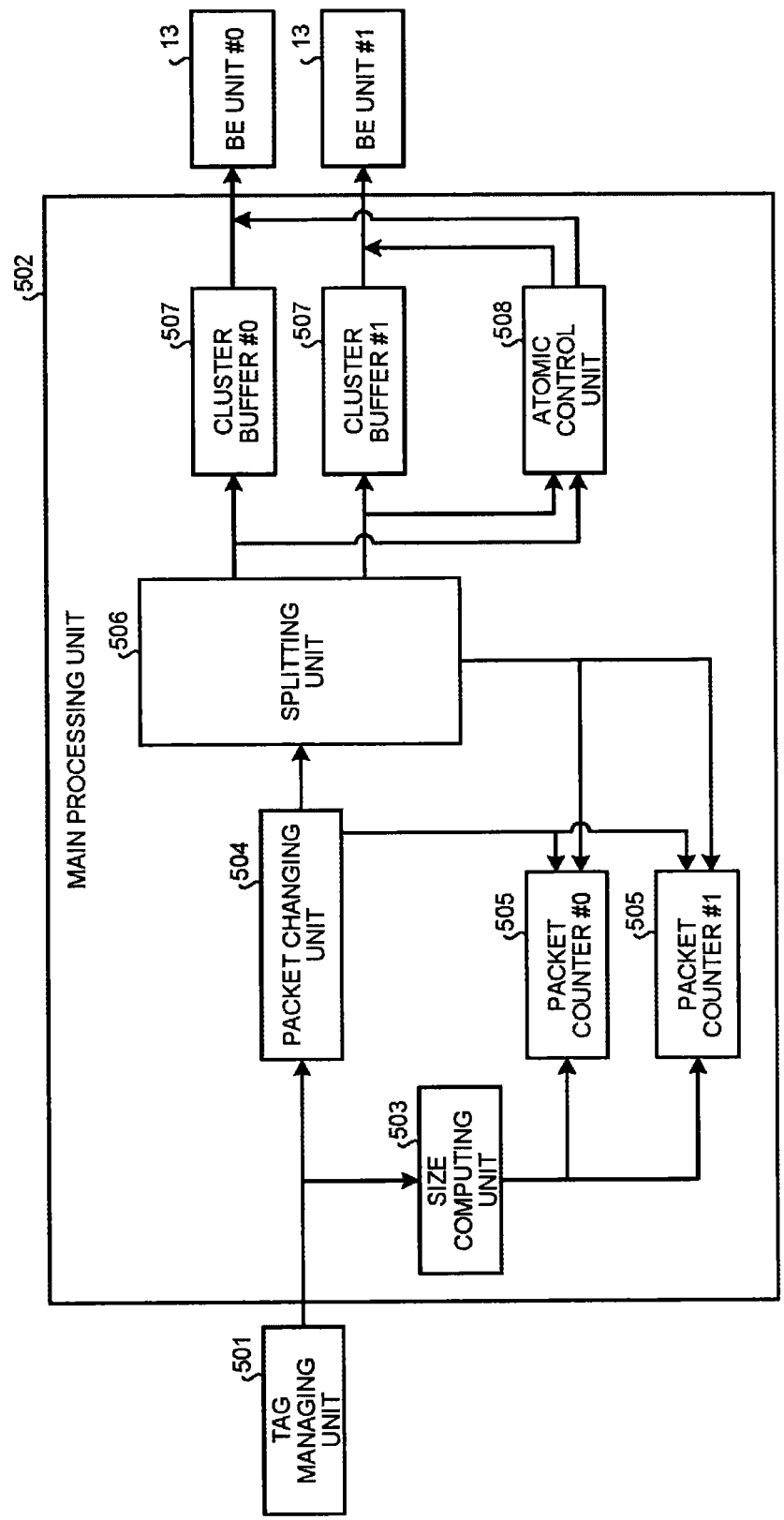
FIG. 6 is a diagram showing the configuration of a main processing unit of the first embodiment.

FIG. 6 is a diagram showing the configuration of the main processing unit 502. The main processing unit 502 comprises a size computing unit 503, a packet changing unit 504, two packet counters 505, a splitting unit 506, two cluster buffers 507, and an atomic control unit 508. The two packet counters 505 correspond to the different BE units 13 respectively. The packet counter 505 corresponding to the BE unit #0 may be referred to as packet counter #0. The packet counter 505 corresponding to the BE unit #1 may be referred to as packet counter #1.

The two cluster buffers 507 are buffers for transmitting packets 200 in cluster units to the two BE units 13. The two cluster buffers 507 are constituted by, e.g., registers or small-scale memories. The two cluster buffers 507 correspond to the different BE units 13 respectively. The cluster buffer 507 for transmitting packets 200 to the BE unit #0 may be referred to as cluster buffer #0. The cluster buffer 507 for transmitting packets 200 to the BE unit #1 may be referred to as cluster buffer #1. Each cluster buffer 507 has an enough size to store at least packets 200 of a cluster unit.

The size computing unit 503 computes the number of packets 200 to be sent to each BE unit 13 based on the size 204 recorded in the packet 200 received first. Then the size computing unit 503 sets the number of packets 200 to be transmitted to the BE unit #0 in the packet counter #0 and sets the number of packets 200 to be transmitted to the BE unit #1 in the packet counter #1.

The splitting unit 506 receives packets 200 via the packet changing unit 504 and stores the received packets 200 into the cluster buffer #0 or #1. The splitting unit 506 decides on the cluster buffer 507 as the storage destination based on the value of a specific bit of the logical address 203. The splitting unit 506 transmits a subtracting instruction to the packet counter 505 corresponding to the BE unit 13 as the transmission destination for the packet 200 each time it stores a packet 200 into the cluster buffer 507.

The packet changing unit 504 monitors the count value of each packet counter 505. The packet changing unit 504 identifies the last packet for each BE unit 13 based on the count value of the respective packet counter 505. The packet changing unit 504 manipulates the values of the last flag 206 and resp flag 207 of the identified last packet.

The atomic control unit 508 monitors packets 200 stored into each cluster buffer 507. If detecting that the last packet has been stored into one of the cluster buffers 507, the atomic control unit 508 prevents data transfer from that cluster buffer 507. Thereafter, when detecting that the last packets have been stored in the two cluster buffers 507, the atomic control unit 508 permits data transfer from the two cluster buffers 507 simultaneously.

Figure 7:
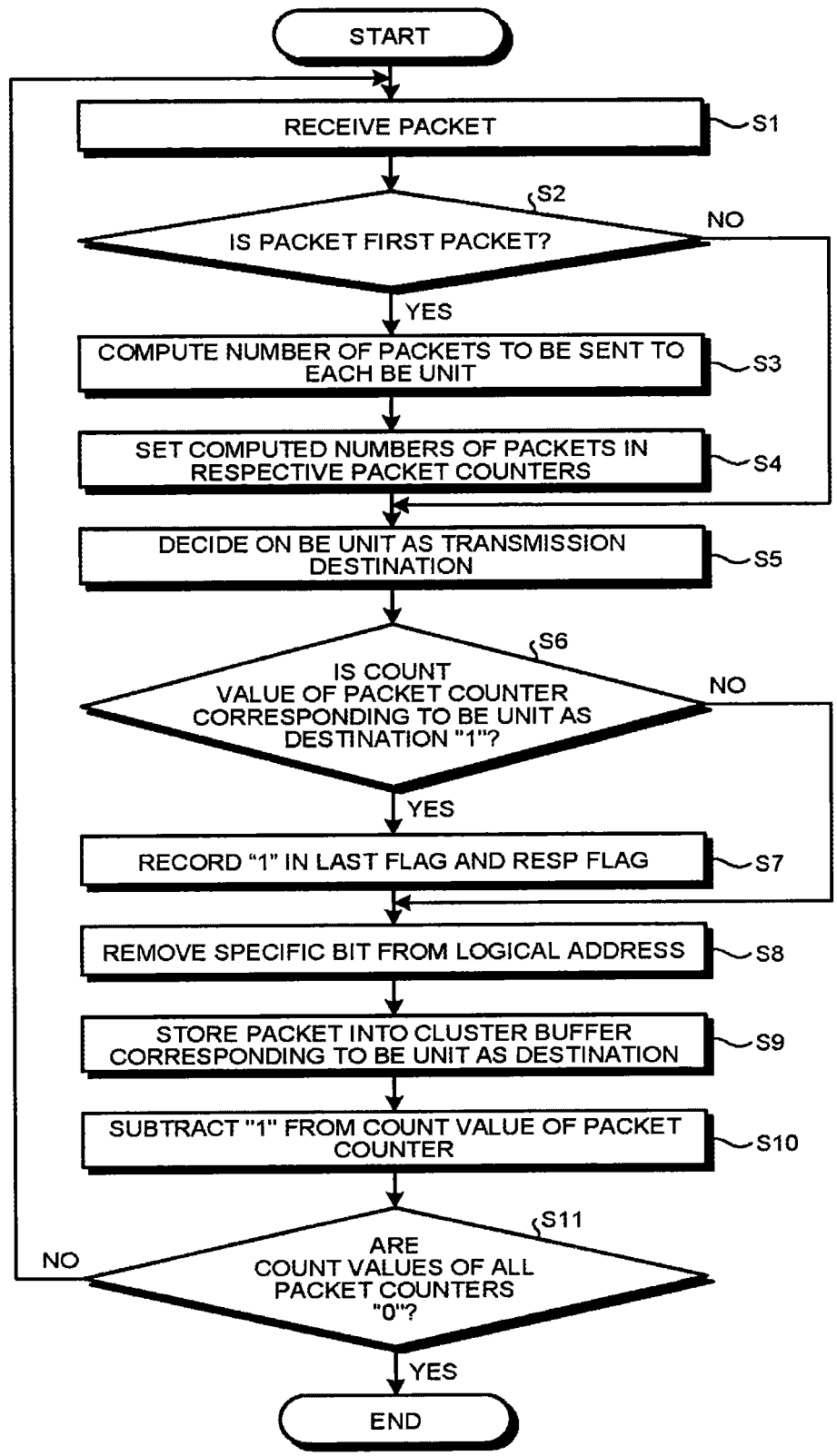
FIG. 7 is a flow chart for explaining the splitting of packets.

FIG. 7 is a flow chart for explaining the splitting of packets 200. When receiving a packet 200 from the FE unit 11 via the tag managing unit 501 (S1), the main processing unit 502, referring to the value of the first flag 205, determines whether that packet 200 is a first packet (S2). If the value of the first flag 205 is "1", then it is determined that packet 200 is a first packet. If the value of the first flag 205 is "0", then it is determined that the packet 200 is not a first packet.

If the packet 200 is a first packet (Yes at S2), then the size computing unit 503 computes the number of packets 200 to be sent to each BE unit 13 based on the size 204 recorded in the packet 200 (S3). The size computing unit 503 sets the computed numbers for the respective BE units 13 in the respective corresponding packet counters 505 (S4). If the packet 200 is not a first packet (No at S2), then the size computing unit 503 skips the processes of S3 and S4.

The packet changing unit 504 decides on the BE unit 13 as the transmission destination of the packet 200 based on the value of a specific bit of the logical address 203 (S5). The packet changing unit 504 determines whether the count value of the packet counter 505 corresponding to the BE unit 13 as the transmission destination is "1" (S6). If the count value of the packet counter 505 corresponding to the BE unit 13 as the transmission destination is "1" (Yes at S6), then the packet changing unit 504 overwrites with "1" to record "1" in the last flag 206 and resp flag 207 (S7). If the count value of the packet counter 505 corresponding to the BE unit 13 as the transmission destination is not "1" (No at S6), then the packet changing unit 504 skips the process of S7.

Subsequently, the packet changing unit 504 removes the specific bit of the logical address 203 recorded in the packet 200, which bit was used in the determination of the destination of the packet 200 (S8). The BE unit 13, the destination, is notified to the splitting unit 506. The splitting unit 506 stores the packet 200 into the cluster buffer 507 corresponding to the BE unit 13 as the destination (S9). Then the splitting unit 506 transmits a subtracting instruction to the packet counter 505 corresponding to the BE unit 13 as the destination, and the packet counter 505 having received the subtracting instruction subtracts "1" from the count value (S10).

If the count values of all the packet counters 505 are "0" (Yes at S11), the splitting operation finishes. If there is a packet counter 505 whose count value is "1" or greater (No at S11), the process of S1 is executed again.

Figure 8:
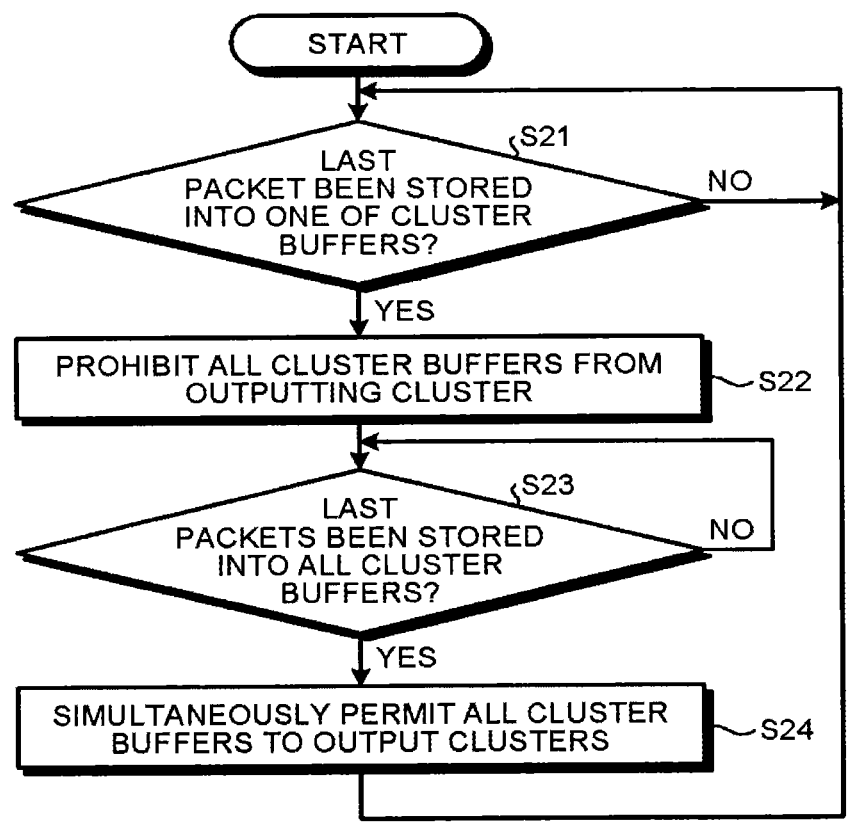
FIG. 8 is a flow chart for explaining the operation of an atomic control unit.

FIG. 8 is a flow chart for explaining the operation of the atomic control unit 508. The atomic control unit 508 monitors packets 200 stored into each cluster buffer 507 and determines whether the last packet has been stored into one of the cluster buffers 507 (S21). If the last packet has been stored into one of the cluster buffers 507 (Yes at S21), the atomic control unit 508 prohibits all the cluster buffers 507 from outputting a cluster (S22). If the last packet is not stored in any cluster buffer 507 (No at S21), the atomic control unit 508 executes the process of S21 again.

After the process of S22, the atomic control unit 508 determines whether the last packets have been stored into all the cluster buffers 507 (S23). If there is a cluster buffer 507 in which the last packet is not stored (No at S23), the atomic control unit 508 executes the process of S23 again. If the last packets have been stored into all the cluster buffers 507 (Yes at S23), the atomic control unit 508 simultaneously permits all the cluster buffers 507 to output clusters (S24). Thus, clusters including the last packets are simultaneously transferred from all the cluster buffers 507 to the BE units 13. After the process of S24, the process of S21 is executed again.

When receiving responses from all the BE units 13, the main processing unit 502 resets the processing contents. If receiving an abort processing instruction before receiving responses from all the BE units 13, the abort processing unit 500 executes abort processing.

Figure 9:
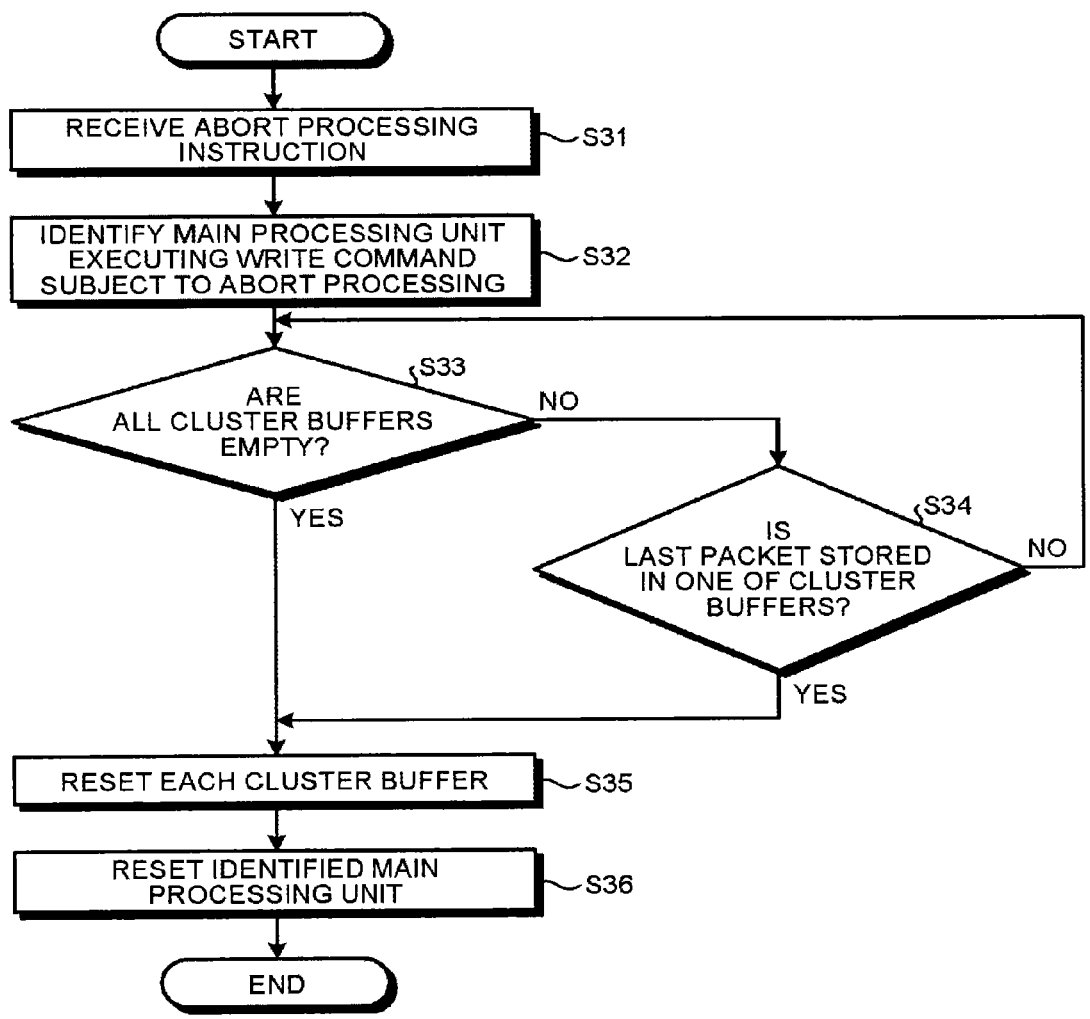
FIG. 9 is a flow chart for explaining the operation of an abort processing unit.

FIG. 9 is a flow chart for explaining the operation of the abort processing unit 500. When the abort processing unit 500, monitoring the reception of an abort processing instruction, receives an abort processing instruction (S31), it identifies the main processing unit 502 which is executing the write command subject to abort processing (S32). The abort processing instruction includes the tag 208, and the abort processing unit 500 identifies the main processing unit 502 based on the tag 208 included in the abort processing instruction.

Then, the abort processing unit 500 determines whether all the cluster buffers 507 of the identified main processing unit 502 are empty (S33). If one of the cluster buffers 507 are not empty (No at S33), the abort processing unit 500 determines whether the last packet is stored in the not-empty cluster buffer 507 (S34). If the last packet is not stored in the not-empty cluster buffer 507 (No at S34), then the abort processing unit 500 executes the process of S33 again.

If the last packet is stored in the not-empty cluster buffer 507 (Yes at S34), or if all the cluster buffers 507 are empty (Yes at S33), then the abort processing unit 500 resets each cluster buffer 507 (S35). Then the abort processing unit 500 resets the identified main processing unit 502 (S36) to finish operation. The abort processing unit 500 transfers the abort processing instruction to each BE unit 13. When receiving the abort processing instruction before receiving the last packet, the computing unit 400 of each BE unit 13 cancels writing into the NAND memory 14 according to the write command. That is, the computing unit 400 deletes each sector data 202 stored in the storage unit 401.

As such, according to the first embodiment, the split unit 12 transmits the last packet to each BE unit 13 at the same timing, thereby stopping the other BE unit 13 from transferring data to the NAND memory 14 until the delivery of the end packet finishes. By this means, all the BE units 13 are stopped from writing into the NAND memory 14, which is associated with one write data, until the end packet is delivered. Thus, the FE unit 11 can abort the write command at any timing during the time until the delivery of the end packet finishes. That is, atomic write is realized.

Further, while the BE units 11 are being stopped from writing into the NAND memory 14, the abort processing unit 500 has each BE unit 11 cancel writing into the NAND memory 14. Thus, atomic write is realized.

Yet further, the abort processing unit 500 resets the split unit 12. Thus, atomic write is realized.

The split unit 12 transmits packets 200 in clusters to each BE unit 13. Each cluster includes a predetermined number of packets 200. The split unit 12 transmits the end packet as the last packet to one BE unit 13 and at the same time transmits the last packet to the other BE unit 13. Because each BE unit 13 does not process packets 200 until receiving the last packet, all the BE units 13 are stopped from writing into the NAND memory 14, which is associated with one write data, until the end packet is delivered.

Further, the split unit 12 comprises the plurality of cluster buffers 507. Each cluster buffer 507 of the split unit 12 creates clusters for the respective BE unit 13.

The split unit 12 has the plurality of main processing units 502 that distribute respectively a plurality of different write data. Thus, the controller 10 can execute a plurality of write commands in parallel.

Second Embodiment

Figure 10:
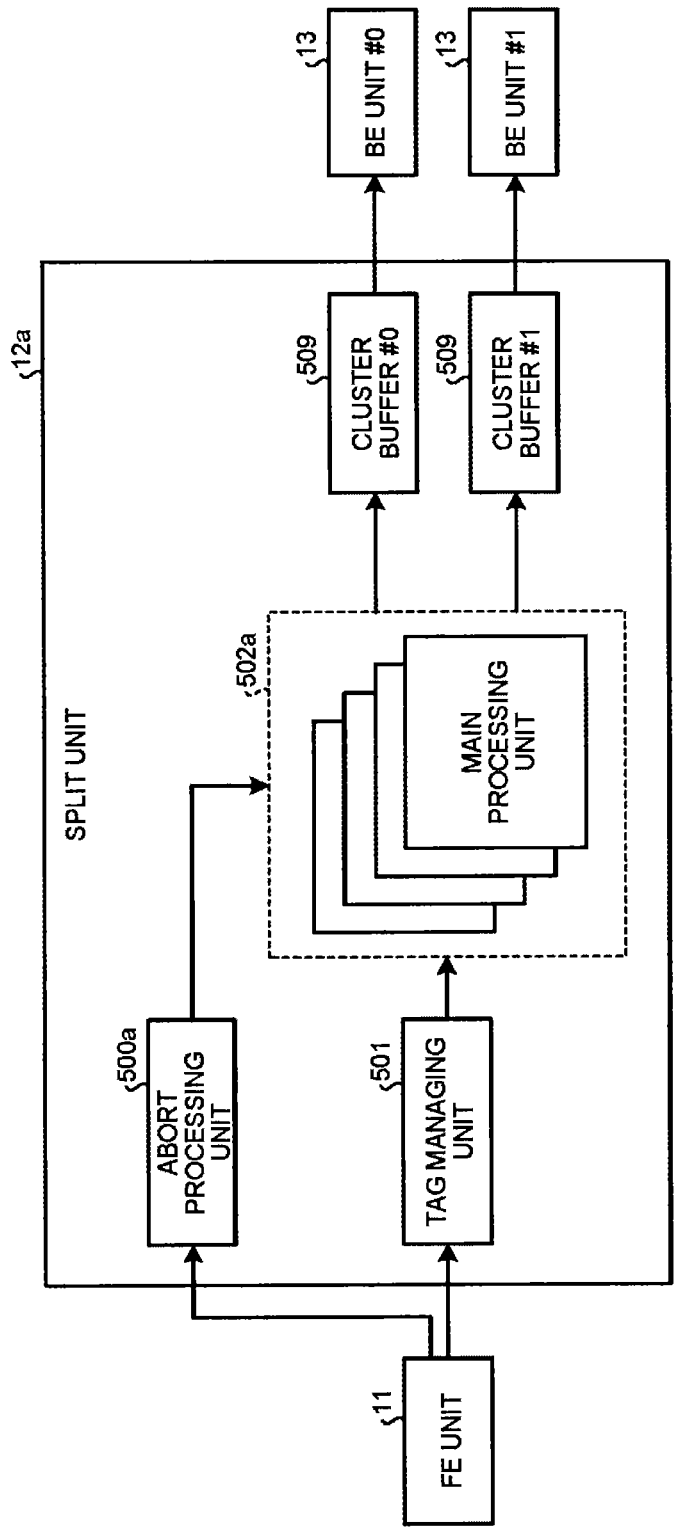
FIG. 10 is a diagram showing the configuration of a split unit of a second embodiment.

FIG. 10 is a diagram showing the configuration of a split unit of the second embodiment. Reference numeral 12a is used to denote the split unit of the second embodiment, thereby distinguishing from the first embodiment. The same names and reference numerals as in the first embodiment are used to denote the same constituents as in the first embodiment, with duplicate description thereof being omitted.

The split unit 12a comprises an abort processing unit 500a, a tag managing unit 501, a plurality of main processing units 502a, and two cluster buffers 509.

The two cluster buffers 509 are buffers for transmitting packets 200 in cluster units to the two BE units 13. The two cluster buffers 509 are constituted by, e.g., registers or small-scale memories. The two cluster buffers 509 correspond to the different BE units 13 respectively. The cluster buffer 509 for transmitting packets 200 to the BE unit #0 may be referred to as cluster buffer #0. The cluster buffer 509 for transmitting packets to the BE unit #1 may be referred to as cluster buffer #1. Each cluster buffer 509 has an enough size to store at least packets 200 of a cluster unit.

The plurality of main processing units 502a split respectively groups of packets 200 having the tag 208 of a different value between groups. When receiving an abort processing instruction from the FE unit 11, the abort processing unit 500a resets the main processing unit 502a that is performing the process for the command subject to abort processing.

Figure 11:
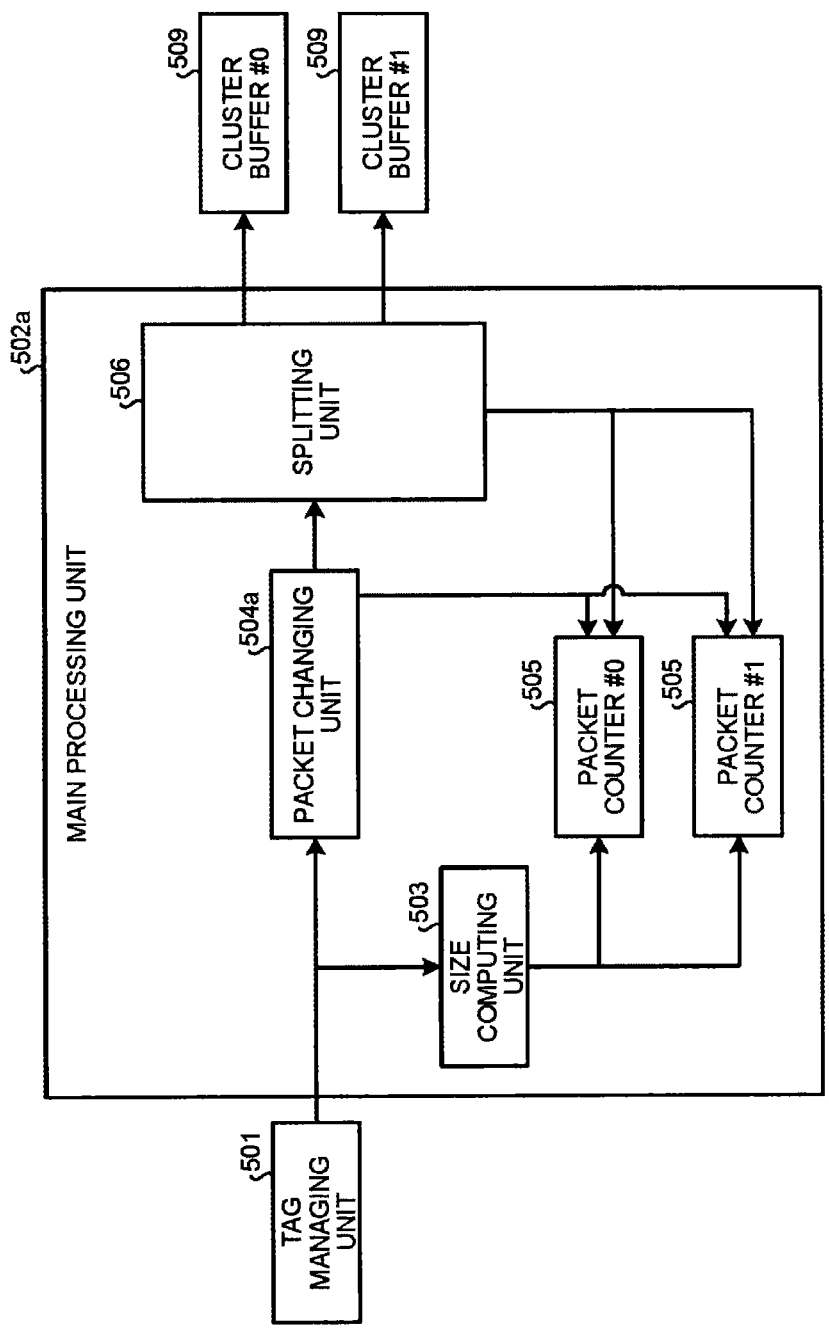
FIG. 11 is a diagram showing the configuration of a main processing unit of the second embodiment.

FIG. 11 is a diagram showing the configuration of the main processing unit 502a. The main processing unit 502a comprises a size computing unit 503, a packet changing unit 504a, two packet counters 505, and a splitting unit 506.

The packet changing unit 504a identifies the respective last packets for the BE units 13 based on the count values of the two packet counters 505. In the second embodiment, when receiving the last packet that is not the end packet from among the identified respective last packets for the BE units 13, the packet changing unit 504a creates a dummy packet having "1" recorded in the last flag 206 and resp flag 207 thereof and stores the created dummy packet therein. The packet changing unit 504a simultaneously inputs the end packet and the created dummy packet to the splitting unit 506. The end packet and the dummy packet are stored into the different cluster buffers 509 respectively and thereafter transferred to the BE units 13. Each BE unit 13 stores packets from the split unit 12a into the storage unit 401 and, when receiving the end packet or the dummy packet, starts processing packets stored in the storage unit 401.

FIG. 12 is a conceptual diagram for explaining processing by the split unit 12a. The split unit 12a, without manipulating the last flag 206 nor resp flag 207 of the last packet (here packet #63) that is not the end packet, transfers it to the BE unit 13. Further, the split unit 12a transfers from the first packet to the end packet asynchronously and, when transferring the end packet, transmits a dummy packet 600 to the BE unit 13 other than the transfer destination of the end packet. The dummy packet 600 is a packet for conveying the last flag 206. The dummy packet 600 conveys the resp flag 207 as well. That is, the dummy packet 600 has "1" recorded in the last flag 206 and resp flag 207 thereof. The BE units 13 simultaneously receive the last packet or the dummy packet 600 and hence can simultaneously start processing.

When receiving an abort processing instruction, the abort processing unit 500a resets the main processing unit 502a and transfers the abort processing instruction to the BE units 13. When receiving an abort processing instruction before receiving the end packet or the dummy packet 600, each BE unit 13 cancels processing packets stored in the storage unit 401.

As described above, according to the second embodiment, when delivering the end packet, the split unit 12a transmits the dummy packet 600 to the BE unit 13 other than the transfer destination of the end packet. The dummy packet 600 is a packet for conveying the last flag 206. Because each BE unit 13 starts processing after receiving the last packet or the dummy packet 600, all the BE units 13 are stopped from writing into the NAND memory 14, which is associated with one write data, until the end packet is delivered.

The method of conveying the last flag 206 is not limited to the use of a packet. Where the split unit 12*a* and each BE unit 13 are connected separately by an exclusive line, the last flag 206 may be conveyed via the exclusive line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a plurality of memories;
   a plurality of first processing circuits, each of the plurality of first processing circuits being connected to at least one of the memories; and
   a second processing circuit that sequentially distributes, to the plurality of first processing circuits, a plurality of items of first data inputted sequentially from an external device,
   wherein each of the first processing circuits outputs the first data distributed thereto to the at least one of the memories, and
   wherein the second processing circuit, until finishing transmission of second data to one of the first processing circuits, prevents the others of the first processing circuits from outputting the first data distributed already, the second data being a last item of the first data inputted from the external device.

2. The memory system according to claim 1, wherein the second processing circuit transmits third data to the others of the first processing circuits at the same time that the second processing circuit transmits the second data to the one of the first processing circuits, and
   wherein after receiving the second data or the third data, each of the first processing circuits starts the outputting.

3. The memory system according to claim 2, wherein the second processing circuit adds the third data to a last item of the first data to be distributed to each of the others of the first processing circuits.

4. The memory system according to claim 1, further comprising a third processing circuit that causes each of the first processing circuits to cancel the outputting while the first processing circuits are prevented from the outputting.

5. The memory system according to claim 4, wherein in a case where an error occurs in input of the first data before the first processing circuits start the outputting, the third processing circuit resets the second processing circuit.

6. The memory system according to claim 3, wherein the second processing circuit transmits the first data as fourth data to each of the first processing circuits, each item of the fourth data including a predetermined number of items of the first data, and
   wherein the second processing circuit transmits an item of the fourth data including the item of the first data to which the third data is added to each of the others of the first processing circuits at the same time that the second processing circuit transmits an item of the fourth data including the second data to the one of the first processing circuits.

7. The memory system according to claim 6, wherein the second processing circuit comprises a buffer for creating the fourth data.

8. The memory system according to claim 1, comprising a plurality of the second processing circuits, wherein each of the plurality of second processing circuits processes a respective one of different write commands, each of the write commands requesting to write a plurality of items of the first data.

9. The memory system according to claim 1, wherein each of the plurality of memories comprises one or more nonvolatile memory chips.

10. The memory system according to claim 9, wherein each of the nonvolatile memory chips includes a NAND flash memory.

11. A memory system comprising:
    a plurality of first processing circuits, each of the plurality of first processing circuits being connected to at least one of a plurality of memories and which output first data to the at least one of the memories; and
    a second processing circuit that sequentially distributes, to the plurality of first processing circuits, a plurality of items of the first data inputted sequentially from an external device and that, until finishing transmission of second data to one of the first processing circuits, prevents the others of the first processing circuits from outputting the first data already distributed, the second data being a last item of the first data inputted from the external device.

12. The memory system according to claim 11, wherein the plurality of items of the first data are data which are requested to be written by a write command, each of the plurality of items of the first data is inputted by a packet individually, and the second data is an item of the first data inputted by a last packet.

* * * * *